Oct. 18, 1966　　　W. A. WIGHT　　　3,279,369
IMPRINTER
Filed Dec. 21, 1964　　　9 Sheets-Sheet 5
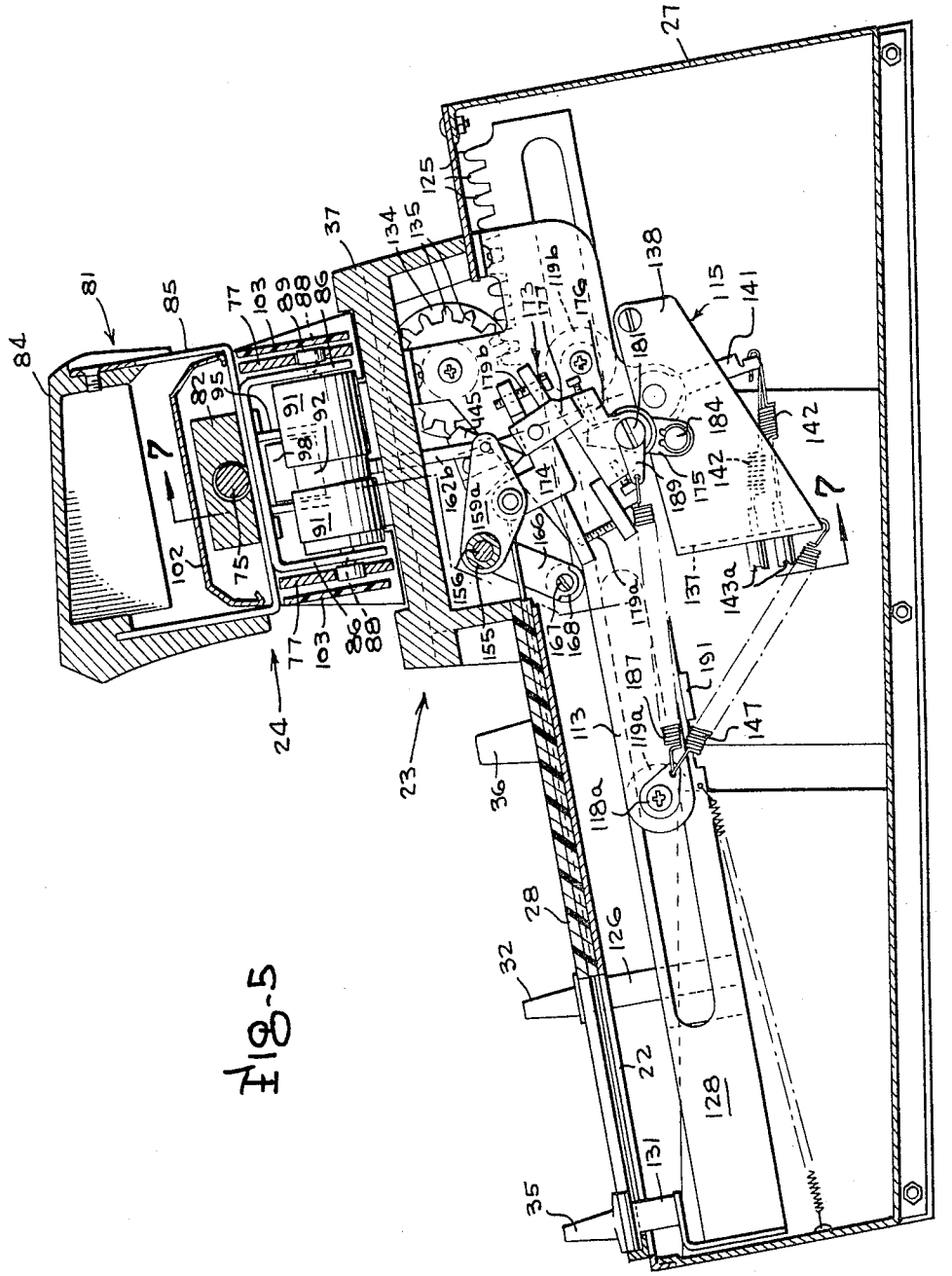
INVENTOR
WILLIAM A. WIGHT
BY Mason, Fenwick & Lawrence
ATTORNEYS

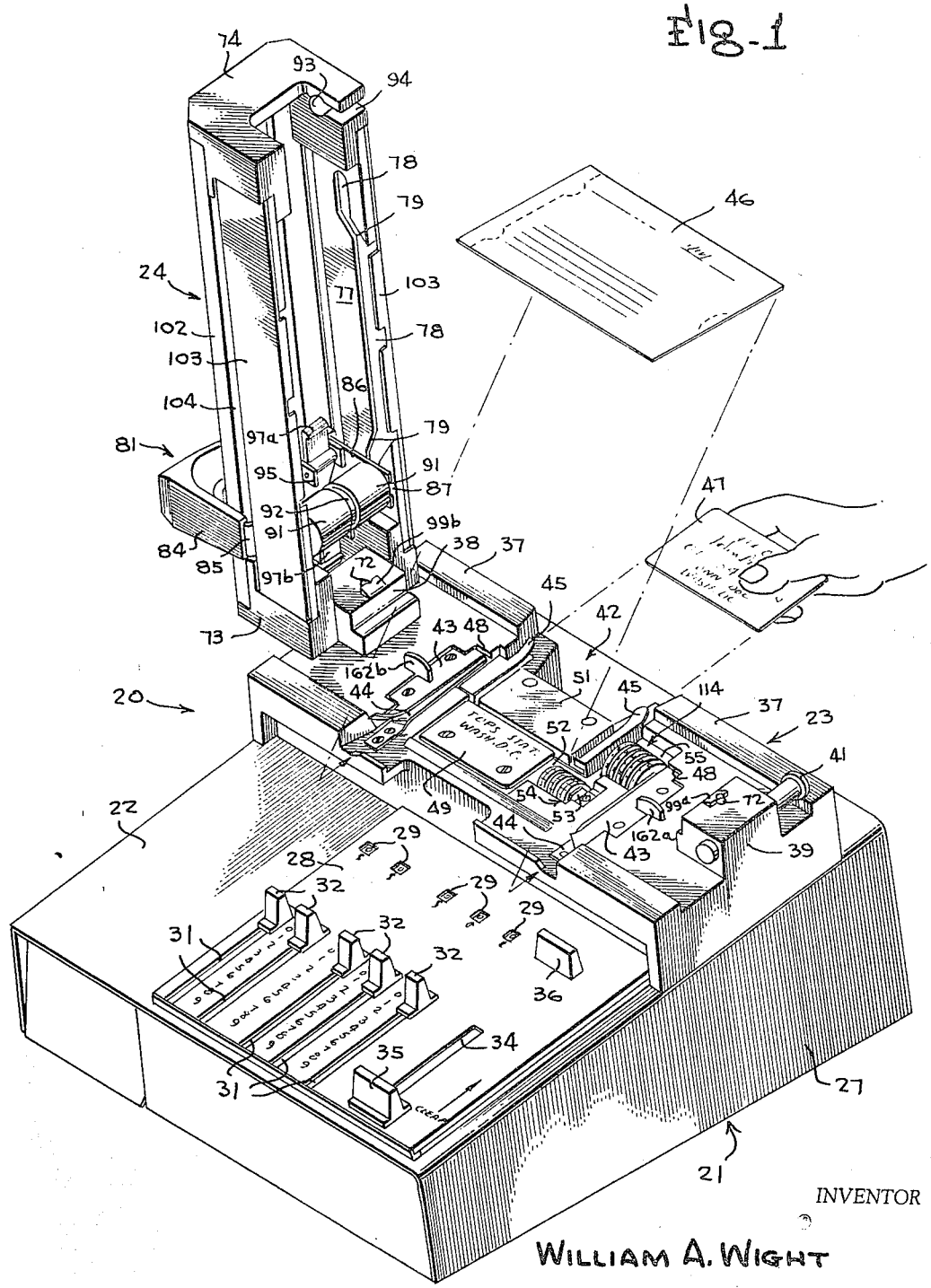

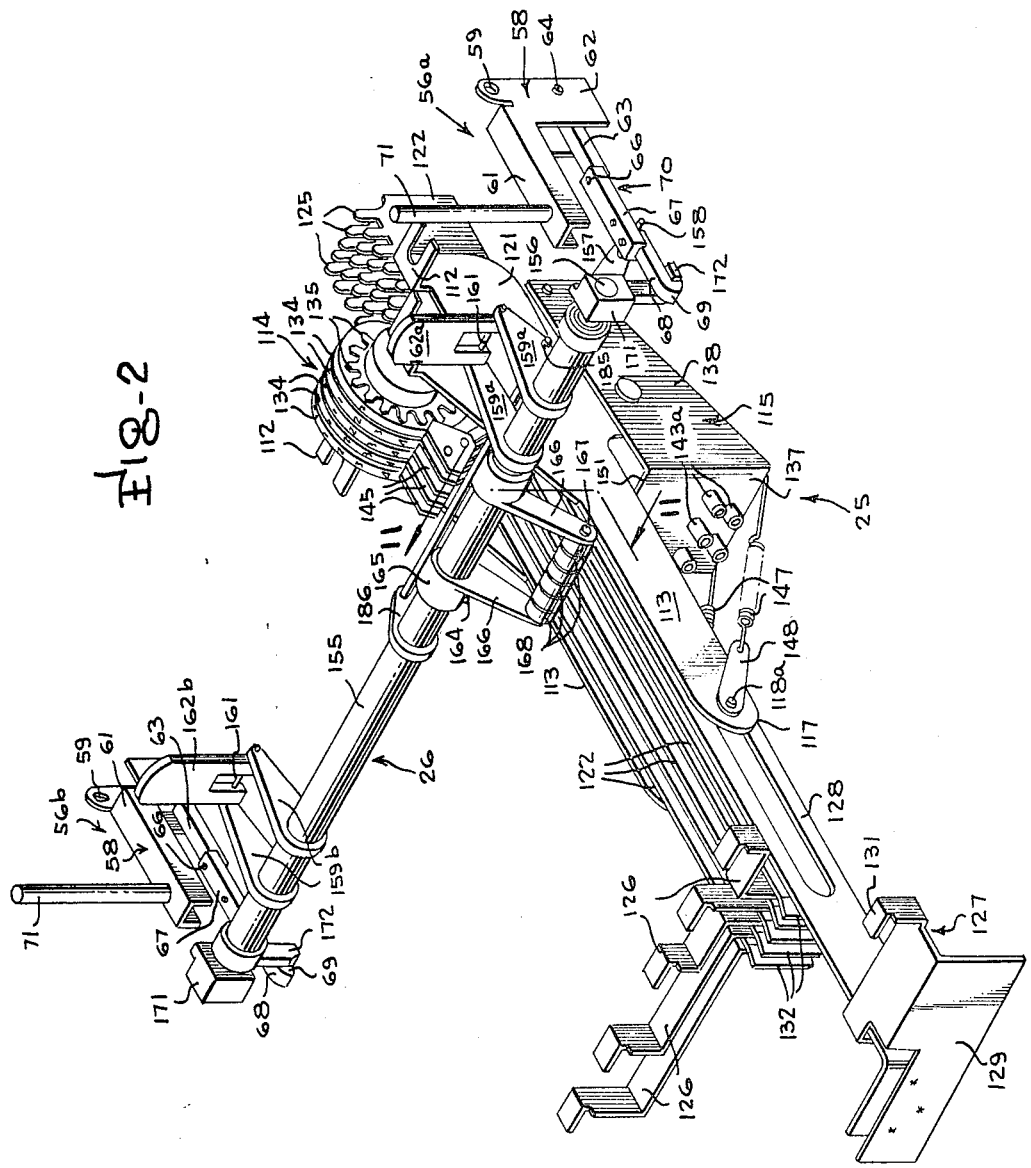

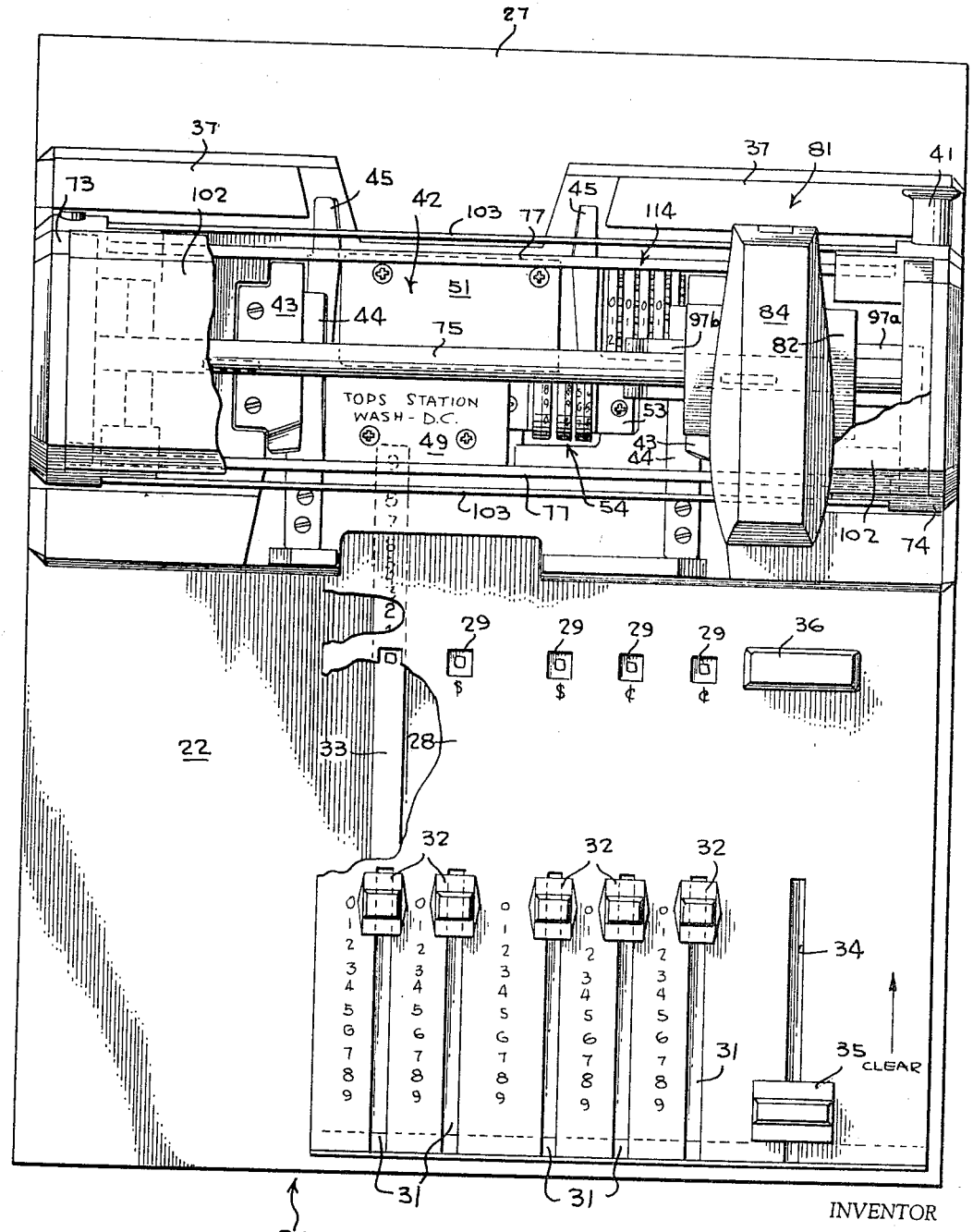

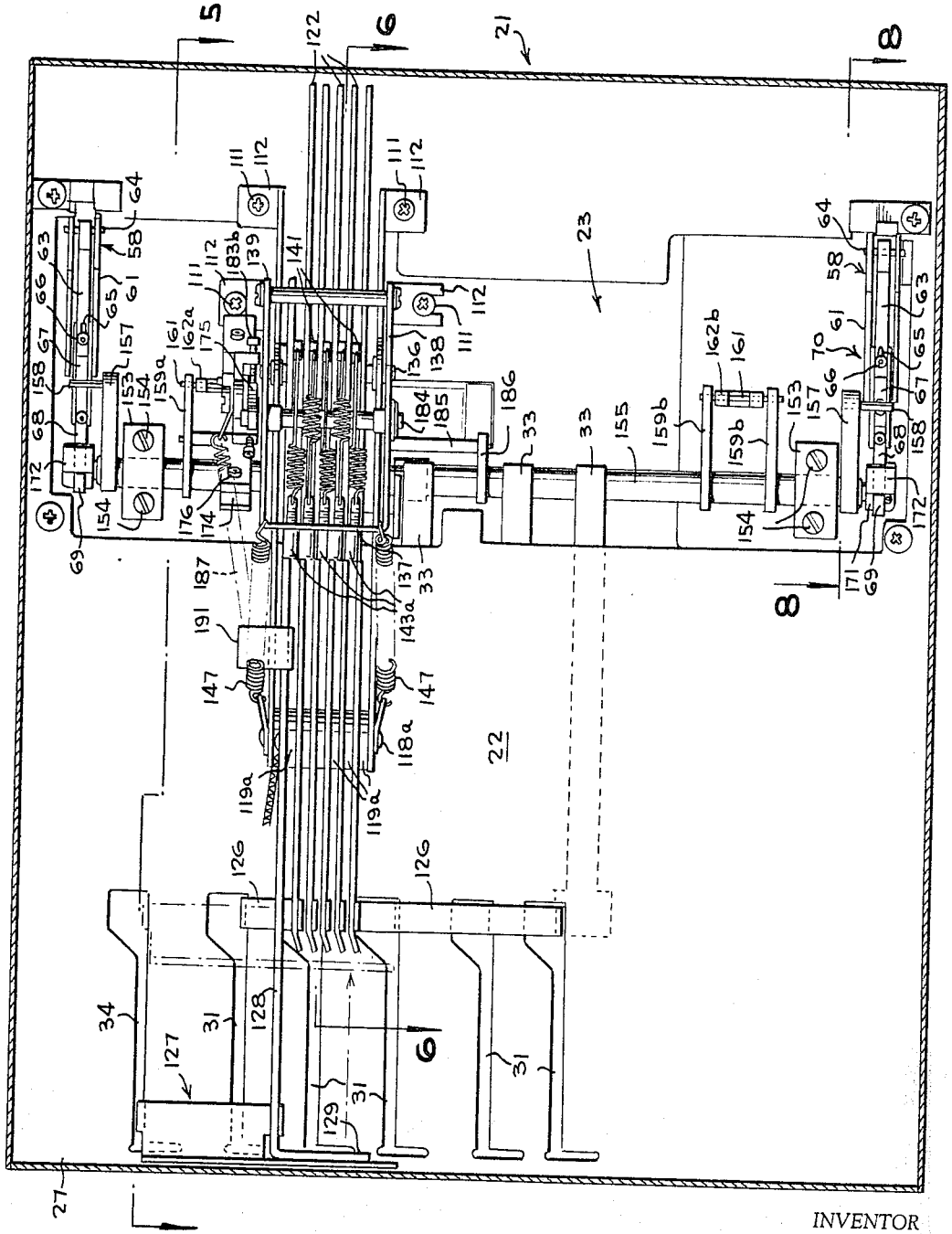

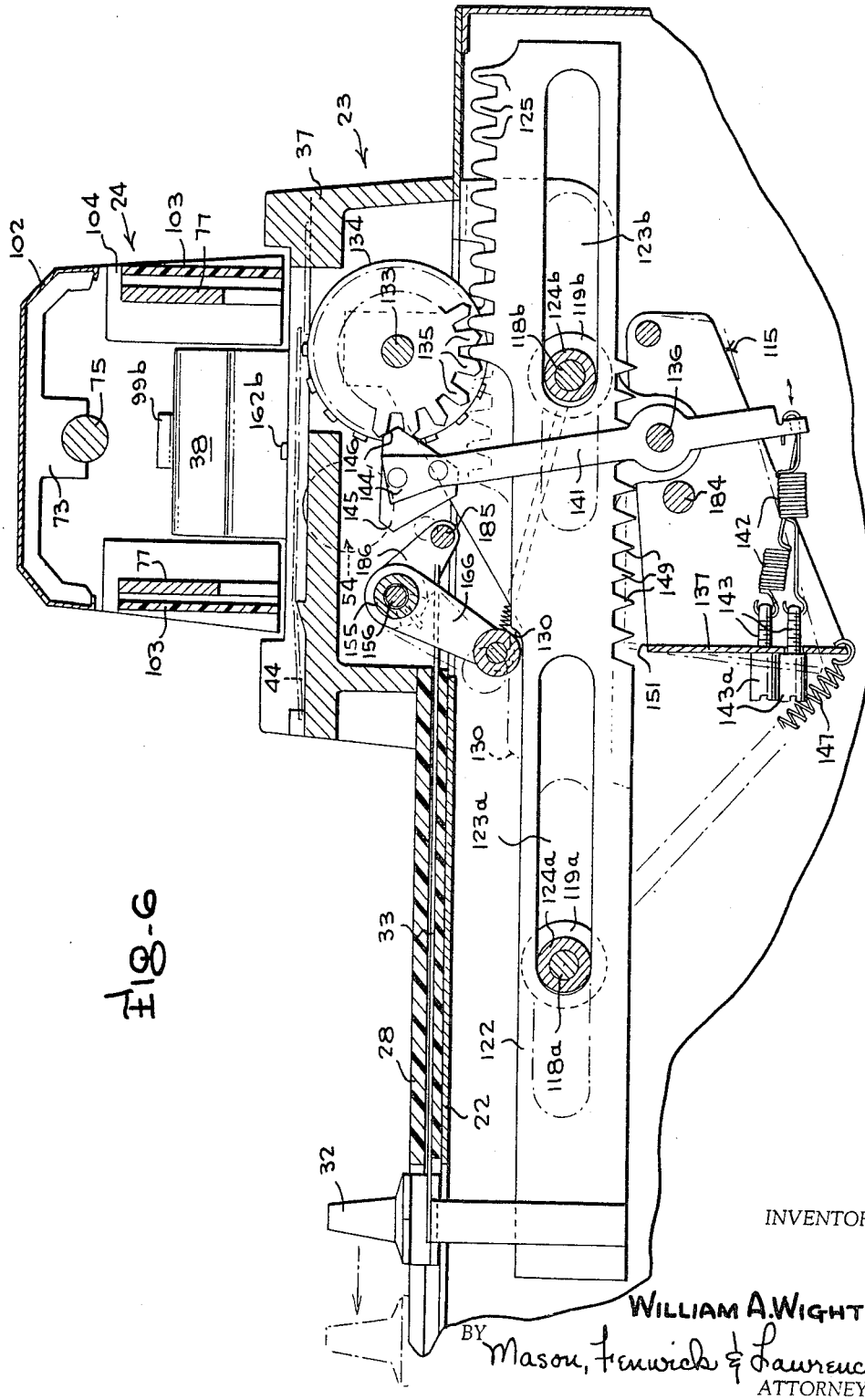

Oct. 18, 1966　　　　W. A. WIGHT　　　　3,279,369
IMPRINTER
Filed Dec. 21, 1964　　　　　　　　　　　9 Sheets-Sheet 7
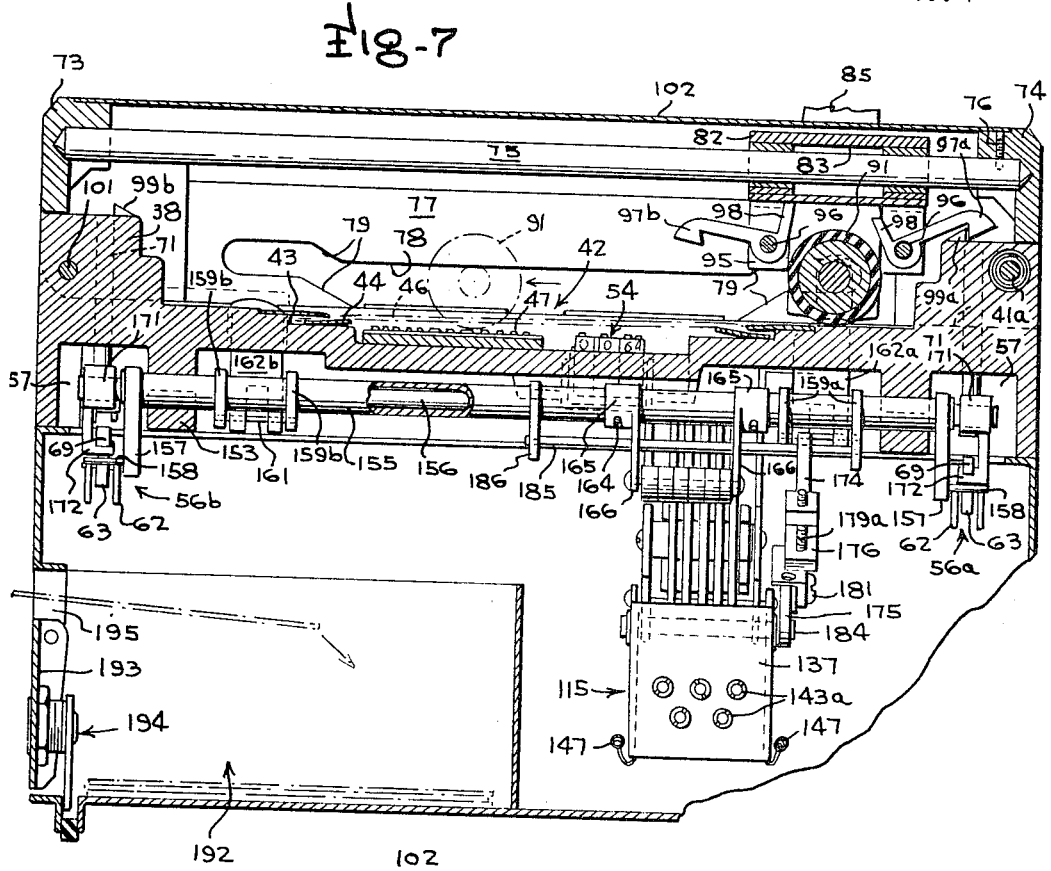
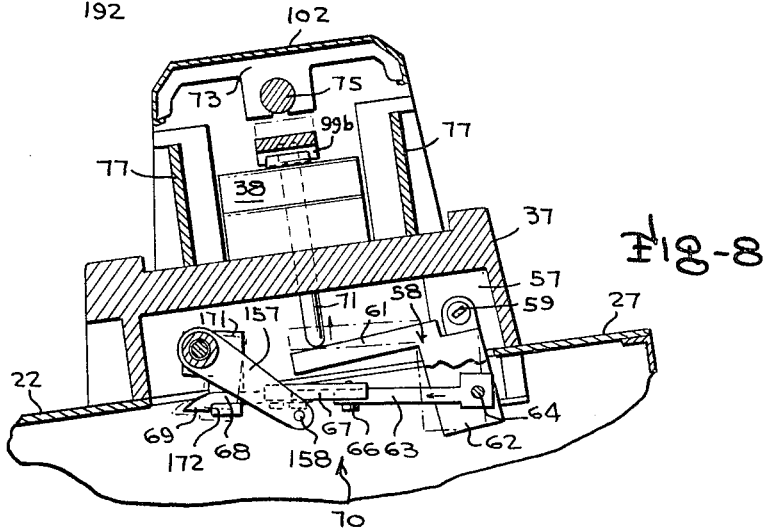
INVENTOR
WILLIAM A. WIGHT
BY Mason, Fenwick & Lawrence
ATTORNEYS

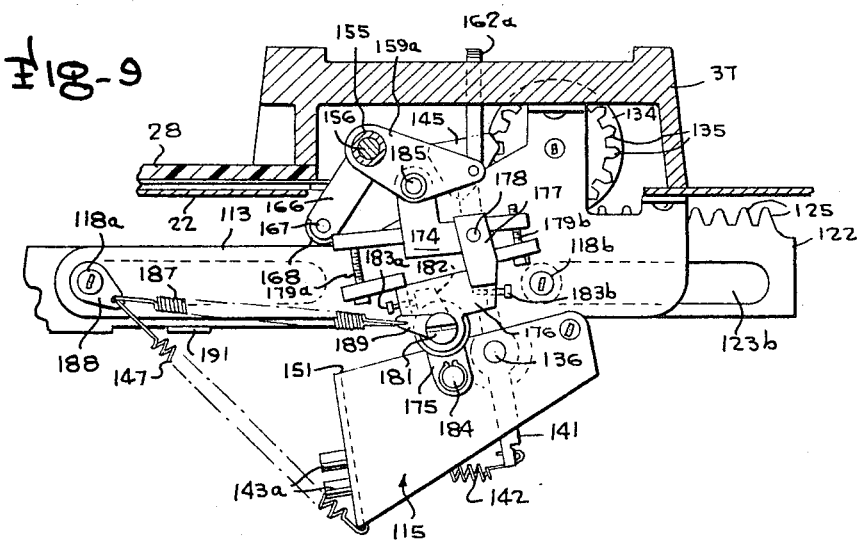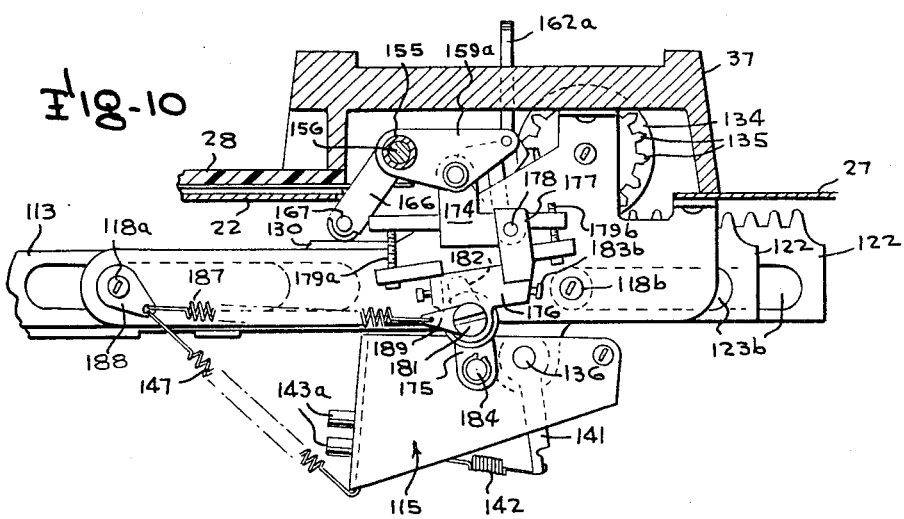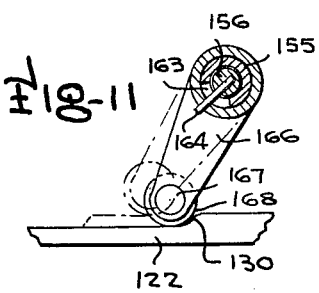

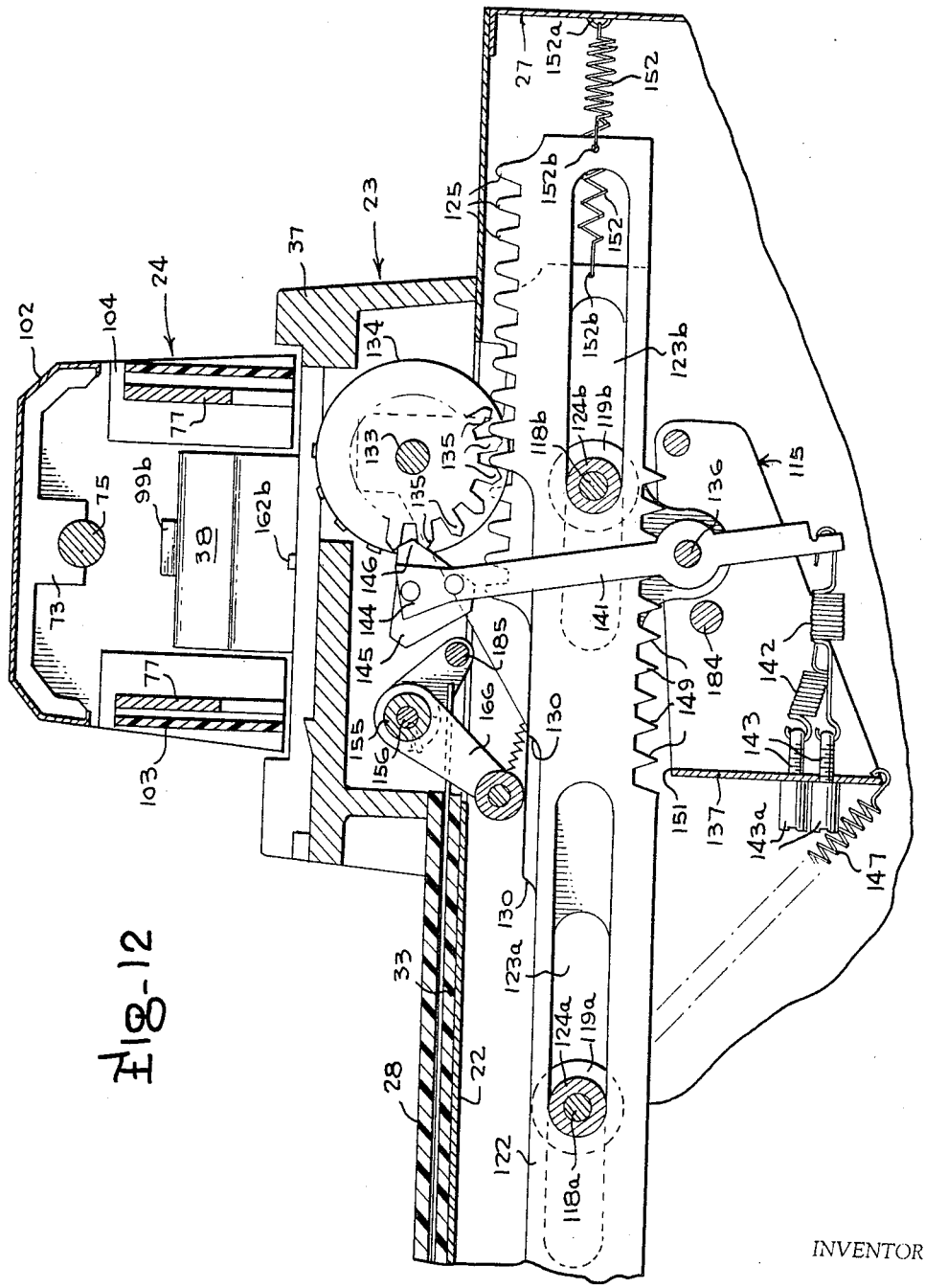

United States Patent Office 3,279,369
Patented Oct. 18, 1966

3,279,369
IMPRINTER
William A. Wight, Vienna, Va., assignor to Farrington Business Machines Corporation, Springfield, Va., a corporation of Massachusetts
Filed Dec. 21, 1964, Ser. No. 420,022
23 Claims. (Cl. 101—269)

The present application is a continuation-in-part of my earlier copending application Serial No. 401,278 filed October 2, 1964.

This invention relates in general to printing machines and more particularly to hand operated printing machines wherein data are printed from individual printing devices positionable within the machine from the exterior thereof.

Such printing machines are generally utilized in retail sales systems wherein the sales are made on credit and enable data in possession of the individual to be printed upon a suitable sales record from which the individual may be later billed.

In prior art devices of this type a movable imprinter head is generally moved across the sales record under which there is positioned the desired printing devices. A distinct deficiency of prior art devices is one which allows the imprinter roller or platen to move back and forth across the sales invoice at any time with the possible result of a false registration. It is extremely prevalent in machines known in the prior art that the operator thereof does not reposition the variable information bits after each successive use. Therefore, it is extremely possible with that type of machine to register a previous sale upon a new invoice inserted into the machine. Machines of the prior art lacked a feature which would provide a resilient forced registration. Also, they failed to provide individual forced registration to each bit, but, rather resorted to a system conjointly acting on all bits at one time. Another deficiency of prior art devices, having capacity for variable digital input, has been that the imprinter head assembly has had to be raised or otherwise moved each time a credit card and a sales invoice is inserted.

Therefore, an object of this invention is the provision of an apparatus for printing variable information, which apparatus is purely mechanical in operation and one which operates with a high degree of logic to prevent false registration.

Another object of this invention is a provision of a printing apparatus which will print various types of fixed and variable intermittently changed information.

Another object of this invention is the provision of a printing apparatus in which a movable platen is locked at the end of each imprinting stroke in such a manner that a second stroke cannot be made until the variable information bits are returned to a reference datum after the first imprinting stroke.

A still further object of this invention is the provision of a printing apparatus which precludes false registration upon the sales invoice by causing certain mechanisms to operate for aligning the variable information bits in a precise order so that a clear imprint will result.

Yet another object of this invention is the provision of a printing apparatus using variable information bits in which these bits are restrained from moving from one position to another during the movement of the platen so as to avoid damage to the machine.

Another object of this invention is the provision of a printing apparatus having variable information bits which may be returned to their reference datum after the imprinting stroke by very little physical effort.

Other objects, advantages and capabilities of the invention will become apparent from the following description, taken in conjunction with the accompanying drawings showing only a preferred embodiment of the invention.

In the drawings:

FIGURE 1 is an overall perspective view of a printing machine constructed in accordance with the present invention showing the printing head and associated platen elevated in a nonprinting position;

FIGURE 2 is an overall perspective view of the digit wheel assembly and main shaft assembly utilized in the present invention;

FIGURE 3 is a top plan view of the printing machine with certain parts broken away for clarity;

FIGURE 4 is a bottom plan view of the printing machine showing the external chassis housing in section;

FIGURE 5 is a side elevation view in vertical section of the printing machine taken along lines 5—5 of FIGURE 4;

FIGURE 6 is a partial side elevation view in vertical section taken along lines 6—6 of FIGURE 4;

FIGURE 7 is a vertical cross section taken along lines 7—7 of FIGURE 5;

FIGURE 8 is a vertical cross section of a portion of the imprinter head base assembly taken along lines 8—8 of FIGURE 4;

FIGURE 9 is a side elevation view in vertical cross section similar to FIGURE 5, however, showing the toggle mechanism at the end of the printing stroke but before the variable information bits are returned to the reference datum;

FIGURE 10 is a side elevation in vertical cross section similar to FIGURES 5 and 9 showing the digit wheel assembly and toggle mechanism during the act of printing;

FIGURE 11 is a vertical cross section view of the main shaft assembly along lines 11—11 of FIGURE 2; and FIGURE 12 is a partial side elevation view in vertical section similar to that of FIGURE 6, however, showing a separate embodiment of the invention.

GENERAL OUTLINE

Referring to the drawings wherein like reference characters designate corresponding parts throughout the several figures and particularly to FIGURES 1 and 2, the printing machine of the present invention is generally indicated by the reference character 20. The present printing apparatus generally comprises an imprinter chassis assembly 21 which is preferably formed of a unitary casting or constructed by bending heavy gauge metal. Mounted upon the top face 22 and toward the rear thereof is an imprinter head base assembly 23 which has at one side thereof a head assembly 24 located for swinging movement up and away from the head base assembly.

Within the confines of the imprinted chassis assembly 21 is located a digit wheel assembly 25 and a main shaft assembly 26. The digit wheel assembly 25 and the main shaft assembly 26 are interconnected in a manner to be later discussed. However, it should suffice to say that the digit wheel assembly 25 is mounted to the underside of the imprinter chassis assembly 21, and the main shaft assembly 26 is integrally positioned on the underside of the head base assembly 23.

The various individual assemblies of the machine will be described below under appropriate headings for ease of reference.

IMPRINTER CHASSIS ASSEMBLY

The unitary frame 27 has mounted upon the top face 22 a selector plate 28 having a plurality of apertures 29 which allow the monetary designations of the particular credit sale to be visually conveyed to the machine operator. At the lower end of the selector plate 28 is a parallel array of slots being in registry with similar slots on the face 22 of chassis frame 27. These slots 31 allow the tabulator knobs 32 to be interconnected with the digit wheel assembly 25. It can be seen in FIGURE 1, that each slot 31 has a plurality of digits imprinted upon the selector plate 28 in numerical order. When the tabulator knobs 32 are opposite any particular number then that number will also register in the corresponding aperture 29 to provide a visual cross reference check for the operator.

As illustrated in FIGURE 3, each tabulator knob 32 has fixed to its underside a suitable number slide 33 which is adapted to be reciprocated in sliding movement between the interior surfaces of selector plate 28 and top plate 22. The number slides 33 have suitably imprinted numerals showing through the apertures 29 to indicate the amount of the credit sale to take place.

To one side of the parallel array of tabulator slots 31 is an additional slot 34 which may be called a clearing tabulator slot. Adapted to move within slot 34 is a clearing bar knob 35 which will be operated in a manner to be subsequently described so as to clear all digits other than zeroes from the apertures 29. To enable the machine operator to easily clear the apparatus of previously used digits, a zeroing grip 36 is spaced upwardly from the clear bar knob 35 in a position that corresponds generally on a line passing through apertures 29. To clear the machine the operator would normally place a thumb on the downward side of clear bar knob 35 and two or more fingers on the same hand on the zeroing grip 36. Then by merely closing his grip the clearing bar knob 35 is caused to move toward zeroing grip 36 thereby clearing the machine in the approved manner.

IMPRINTER HEAD BASE ASSEMBLY

Referring now to FIGURES 1, 2 and 8 the imprinter head base assembly 23 comprises an imprinter base 37 generally mounted upon the top face 22 of chassis 27 and toward the rear thereof. At one side of the base assembly is a head support block 38 upon which the head assembly 24 is mounted for pivotal movement. At the other end of the base 37 is a head lock pin block 39 having a throughbore in which is located a head lock pin 41 adapted for linear reciprocation in the throughbore to interfit with the head assembly 24 and hold it closely adjacent the base assembly. Within the central portion of the base assembly is a printing station 42 generally bounded on the sides by a pair of upper invoice guides 43 and a pair of lower invoice guides 44. Located inwardly of the invoice guides 43, 44 is a pair of credit card guides 45, which like the invoice guides, are composed of resilient material that will maintain an inserted invoice 46 or credit card 47 in proper printing position.

In the case of the invoice 46, it is anticipated that it would be inserted between the upper and lower invoice guides until it comes to rest against stops 48 and thereby overlie the dealer anvil 49 upon which is positioned the name of the retailer where the sale is performed. The credit card 47 would be inserted between the guides 45 and the customer anvil 51 upon which there is no identifying indicia. However, the card 47 would have raised indicia in relief that would be caused to imprint upon the overlaid invoice at such time as the imprinter head assembly 24 is caused to operate.

It is obvious that the credit card and invoice will be inserted into their respective guides at any time notwithstanding the fact that the head assembly normally overlays these guides. That is, the head assembly 24 need not be raised each time a credit card or invoice form is put in the machine.

Located adjacent the dealer anvil 49 is a date wheel assembly aperture 52 in which is located a date wheel assembly 54 held by a suitable bracket 53 and comprising various independently movable wheels carrying indicia thereon denoting various combinations of numerals which may be positioned to indicate the correct month, day, and year of the sale upon the invoice when it is imprinted. Adjacent the date wheel assembly is a second large aperture 55 conveniently called the "digit wheel aperture."

On the underside of the imprinter head base assembly 23, which may best be seen by referring to FIGURES 2, 7 and 8 there is affixed a pair of unlocking assemblies 56a, 56b which are generally identical in construction except that one is made for operation of the left-hand side of the machine and the other for operation of the right-hand side. Since the parts of these assemblies are so nearly identical it will suffice to describe only one. Pivoted to depending flanges 57 of the bottom of the imprinter base 37 is an unlocking lever 58 which is pivoted in bell crank fashion about pivot point 59. The lever 58 has a channel shaped arm 61 at right angles to a depending U shaped yoke section 62 in which is pivotally mounted a pivot line link 63 upon the unlocking lever shaft 64. At the free end of the line link 63 is an elongated aperture 65 (see FIGURE 4) through which projects a suitable fastener 66 which interconnects shrinker link 67 with line link 63. At the other end of the shrinker link 67 there is affixed an elongated unlocking hook 68 that has a depending free hook portion 69 adapted to cooperate with the main shaft assembly 26 during operation of the instant printing machine 20.

More conveniently, the parts denoted by numerals 63, 67, and 68 may be called the "hook, line and shrinker assembly" 70.

Normally resting atop the channel shaped arm 61 of unlocking lever 58 is a head release pin 71 that projects upwardly through the bore 72 in the head support block 38 and the lock pin block 39. In the present machine the pins 71 are adapted to reciprocate within the bores 72 upon the urging of unlocking lever 58 in a manner later to be described.

HEAD ASSEMBLY

As illustrated in FIGURES 1, 3, 5 and 7, the head assembly 24 comprises an end pivot block 73 and an end lock block interconnected by head slide shaft 75 extending between the interior portions of the end blocks 73, 74. The head slide shaft 75 is positioned within each end block and maintained therein by suitable set screws 76. Further interconnecting the end blocks and providing lateral stability are a pair of head guides 77 which are mounted on opposite sides of the end blocks in generally opposed relation. Each head guide 77 has a longitudinal slide slot 78 running generally its entire length. Along a portion of the slide slot 78 are suitable camming surfaces 79. A printing head 81 is adapted to reciprocate between the end blocks 73, 74 in cooperation with the slide shaft 75 and head guides 77. Comprising the printing head 81 is a printing roller slide 82 which is longitudinally apertured, indicated by numeral 83, so that it may fit about shaft 75 and slide freely thereon when handle 84 is moved. The handle 84 is connected to the slide 82 by means of suitable brackets 85 which bend at right angles and fit underneath the slide in a proper recess.

Depending from the underside of the slide 82 is a roller bracket 86 of generally U shaped configuration having at its extreme ends slotted portions 87 which receive the roller shaft 88. Supporting the roller shaft 88 for reciprocative movement within the head guides 77 are roller bearing washers 89 which are adapted to slide within the slide slot 78 when the printing head 81 is reciprocated. Located on the shaft 88 are a pair of platens or imprinter rollers 91 sandwiching therebetween actuator roller 92 having a diameter slightly less than that of the imprinter rollers.

The printing rollers 91 are of the type disclosed in U.S. Patent No. 2,620,730, being impregnated with a suitable permanent type printing ink. The type of ink used is a dry type which is transferred from the roller to the invoice form 46 only upon pressure being applied by the roller and the invoice.

The lock block 74 when in operative position mates with the lock pin block 39 and the lock pin 41. On one side of the block 74 there is located an aperture 93 of the same general diameter as pin 41. This allows the pin 41 to be positioned therein when the head assembly and the head base assembly are in a printing position. Shown in the drawings in FIGURE 7 is a portion 41a of the pin 41 which is reduced in diameter to facilitate the locking slot 94 of block 74 to be positioned over the pin 41 so that the large diameter portion of the pin may fit within aperture 93. In actual operation the pin 41 would be withdrawn partially from block 39 to expose the reduced diameter portion 41a and then the head assembly 24 would be pivoted downwardly with the locking slot 94 passing about the reduced diameter a portion 41a of pin 41 to a position where the aperture 93 is in registry with the full diameter portion of pin 41. At this time the pin 41 would then be returned to its rest position on block 39 and firmly engage head assembly 24 in printing position.

Depending from the underside of the printing roller slide 82 and on either side of the roller bracket 86 are hook brackets 95. Each bracket 95 has a hook shaft 96 bridging the space between the U shaped legs of the bracket upon which is pivotally mounted head lock hooks 97a, 97b. By gravity alone the hooks 97a, 97b maintain a downwardly facing position but are maintained from falling past a predetermined vertical position by stop 98. The hooks 97a, 97b are adapted to mate with ramp catches 99a, 99b respectively. As can be seen, especially in FIGURE 7, when the printing head 81 is in one of its two limit positions to the respective hook 97a engages the proper catch 99a. Such an engagement prevents the head from being reciprocated in the reverse direction until such time as the proper logic has been supplied to the machine to allow the operative parts of the machine to release hook 97a from catch 99a. In the opposite limit position of printing head 81 it is easily seen that hook 97b will engage ramp catch 99b.

The head assembly 24 is pivotally mounted to the head support block 38 by means of a pivot pin 101 positioned in the support block 38 and extending at each side into the end pivot block 73. Means to prevent the entrance of dirt and other elements to the printing head apparatus is provided by a head cover 102 and a pair of side panels 103. Between the head cover 102 and the side panels 103 a suitable opening 104 is provided so that the handle 84 and its associated bracket 85 may reciprocate in the desired manner.

DIGIT WHEEL ASSEMBLY

Referring now to FIGURES 2, 4, and 6 wherein the digit wheel assembly 25 is clearly shown. It can be seen that the assembly is mounted to the underneath of chassis from 27 by means of suitable fasteners 111 passing through mounting lugs 112. The lugs 112 are merely right angle extensions of the rack and wheel brackets 113. In the present digit wheel assembly there is one rack and wheel bracket 113 flanking each side of the assembly to provide support for the operative members thereof. The digit wheel assembly 25 provides support for three major sub-assemblies; namely, the digit wheel 114, the spring rate actuator 115 and the rack and extension arm assembly 116. At the smaller finger like ends 117 of brackets 113 there is an aperture through which a rack support shaft 118a is positioned. This shaft is unitary in structure and covers the entire distance between the pair of brackets 113 while terminating exteriorly thereof. Mounted on the shaft are a plurality of rack shoulder spacers 119a preferably made of nylon which has extremly good anti-friction qualities and long wearing abilities. Near the forward larger end 121 of the brackets 113 there is a similar rack support shaft 118a. Mounted upon shaft 118b are similar rack shoulder spacers 119a to those as noted above.

The rack and extension arm assembly 116 is mounted for longitudinal movement upon the rack shoulder spacers 119a and 119b. Between each of the individual tabulator racks 122 there lies one of the spacers 119a or 119b depending upon which end of the digit wheel assembly is being mentioned. Each of the individual tabulator racks 122 has an elongated aperture 123a or 123b through which the shafts 118a and 118b project. As will be noted in FIGURE 6 the elongated apertures 123a and 123b bear against each circular shoulder 119a and 119b and in fact slide upon the respective projecting shoulder member 124a and 124b which are integral projections from each shoulder spacer. At the rearward end of the racks 122 there is found pointing upwardly a plurality of rack teeth 125 upon the top surface of each of the individual racks. Located forwardly of the rack teeth 125 on each rack 122 is a sloping cam surface 130, the function of which will be later described. At the forwardmost end of each of the racks there is an extension arm 126 which projects laterally outward to a position which corresponds to its respective tabulator slot 31 of the top face 22 in the chassis frame. The extension arms 126 allow the closely spaced racks 122 to be conveniently controlled by the tabulator knobs 32 which are spaced at distances that allow the best practical use.

Flanking one side of the rack array 116 and mounted upon shafts 118a and 118b in a manner similar to the the racks 122 is a clearing bar and rack assembly 127. This assembly has a clearing bar rack 128 of the same general configuration as the racks 122. However, in this case the rearmost end does not include the rack teeth 125 and consequently the top portion of this rack has an uninterrupted linear surface. At the forwardmost portion of rack 128 there is mounted a clearing bar 129 which projects laterally across the path of movement of the individual racks 122. The extension arm 131 of the clearing bar 129 projects upwardly toward the top face 22 and is connected to clearing bar knob 35. As it will later be seen, when the racks 122 are longitudinally moved toward the front of the machine it is possible to move them back to a rest position as shown in FIGURES 2 and 4 by merely moving clearing bar knob 35 rearwardly engaging clearing bar 129 with the forward ends 132 of the racks. Such a procedure obviously will move the rack rearwardly concurrently with the movement of the clearing bar assembly. After such a procedure is accomplished the clearing bar assembly is automatically returned to its rest position by means of the tension spring 127a connected between the chassis and rack 128.

In the rearward uppermost portion between brackets 113 there is positioned the digit wheel shaft 133 upon which is mounted the plurality of digit wheels 134 in adjacent relationship. The digit wheels 134 have integral ends with suitable digits preferably from zero to nine which are caused to be imprinted upon the invoice 46 (see FIGURE 1) during an act of printing by the head assembly 81. The array of digit wheels 134 project upwardly through the digit wheel aperture 55 in the manner shown by FIGURE 1. Each of the digit wheels 134 has projecting outwardly in coplanar relationship from its side a plurality of ratchet teeth 135 adapted to mate with rack teeth 125 of the individual racks 122. Therefore, it is seen that when the racks are moved longitudinally, the rack teeth 125 will mesh with the ratchet teeth 135 and cause the individual digit wheels 134 to revolve. This puts a desired number uppermost on the digit wheel in proper position for printing on the invoice card 46. The meshing of the rack teeth with the ratchet teeth can best be seen by referring to FIGURE 6.

An especially important part of this invention is the provision of the spring rate actuator 115 which is mounted below the rack assembly 116 and connected to the brackets 113 by means of the spring rate actuator shaft 136. The spring rate actuator 11 is so mounted upon the shaft 136 as to be freely rotatable relative to the shaft. The spring rate actuator generally consists of a front wall 137 and side walls 138 and 139. Between the walls 138 and 139 and mounted upon the shaft 136 are a plurality of registration pawls 141 which comprise a bottom end which is transversely slotted to receive pawl springs 142. The pawl springs 142 are suitably hooked in an elongated fashion at one end to mate with the slotted portion of registration pawls 141. The other end of each of the pawl springs 142 are hooked into a pawl spring adjustment screw 143 which has an enlarged head 143a projecting through the front wall 137 by which tension upon the registration pawls 141 by the pawls and the front wall 137 may be adjusted. As can be seen from FIGURE 6 the medial portion of pawls 141 are rotatably mounted upon the shaft 136 and the upper end of the pawls terminate in the vicinity of the digit wheels 134. At the upper end 144 of the pawls 141 there is mounted a registration pad 145 of generally triangular shape in which the triangle has truncated apexes. One of the truncated apexes, noted by numeral 146, is adapted for engagement with the ratchet teeth 145 of the digit wheels. It can be seen from FIGURE 6 that because of the interaction between the registration pawls 141 and the springs 142 with the forward wall 137 there is a detent and ratchet operation between the registration pads 145 and the ratchet teeth 135 of each digit wheel. Because of the particular angle of the truncated apex 146 with respect to the printing ratchet teeth 135 there is easily seen that a perfect detent relationship exists since the ratchet teeth will never assume a point to point relationship with the apex 146 and, therefore, there wil lalways be a proper registration of the numeral or the digit wheel with the invoice 46. The relationship of the registration pad 145 with the ratchet teeth 135 as shown in FIGURE 6 indicates a perfect registration as was just described.

The spring rate actuator 115 has its forward wall, and consequently its entire forward facing portion, constantly biased upwardly by means of the main tension springs 147 which connect between the forward wall 137 and a spring lug 148 affixed to the brackets 113. The reason for this constant upwardly bias will be later shown.

Referring again to FIGURE 6 and in addition to FIGURES 9 and 10, the racks 122 have along their bottom lineal surfaces spaced pointed teeth 149 which as can be seen in FIGURE 6 will mesh with the up surface 151 of forward wall 137. However, this engagement will only take place when the spring rate actuator 115 is allowed to be drawn upwardly by main tension springs 147 to the position shown in phantom lines of FIGURE 6. When the spring rate actuator forward wall 137 lies between any two adjacent teeth 149 the individual racks 122 will offset any point to point engagement between any pad 145 and corresponding gear tooth 135 and will prevent movement of each of the racks to an adjacent digit indication.

In the embodiment shown by FIGURE 12 there is provided a certain means for returning the individual tabulator racks 122, and consequently the tabulator knobs 32 and the individual digit wheels 134, to a zero reference datum position after the imprinting stroke has been made. The said means include a tension spring 152 connected between a suitable connecting point 152a on the interior back wall of the chassis frame 27 and an aperture 152b at the rearmost portion of the tabulator racks 122. The rack 122 shown in the foreground of FIGURE 6 has its return spring in its most shortened position indicating that this particular rack and its associated digit wheel and tabulator knob are at their zero reference datum position.

The next adjacent rack 122 is shown for illustrative purposes to be in a position indicating that movement of its knob 32 has been effected to a specific position upon selector plate 28. The spring associated with the last mentioned rack is in a tensioned position and it is prevented, by the detent action of the registration pads 145 against teeth 135, from returning the rack to a reference datum position automatically until an imprinting stroke has been made.

It should be noted that in this embodiment, as shown by FIGURE 12, all of the individual racks 122 would normally be equipped with springs 152 and in addition the clearing bar rack 128 would be similarly equipped. However, since there would be no need for manual control of the clearing bar rack 128 the clear bar knob 35 and the zeroing grip 36 would be omitted along with the associated clear bar knob extension arm 131.

MAIN SHAFT ASSEMBLY

As seen in FIGURE 2 the main shaft assembly 26 is positioned between the digit wheel assembly 25 and the bottom of head base assembly 23. The remote ends of the main shaft assembly are suitably journaled in main shaft bearings 153 (see FIGURE 4). These bearings are suitably affixed to the underside of head base assembly 23 by mounting screws 154. The main shaft assembly 23 generally comprises concentric and relatively rotatable outer and inner shafts 155 and 156 respectively. Outboard of the bearings 153 and fixedly positioned to the outer shaft 155 are identical elliptical shaped unlocking interlocks 157 having their larger portion fixed about the shaft and the smaller portion projecting downwardly adjacent the hook, line and shrinker assembly 70 with a projecting lifting pin 158 fixed in interlock 157 and passing under the shrinker 67. Inwardly of the bearings 153 are pairs of parallel spaced actuator support levers 159a, 159b fixed to the outer shaft 155 wherein each pair of support levers have an actuator support pin 161 between their ends that are remote from the shaft. Attached to the lever 159a by means of support pin 161 is an actuator 162a which has a rounded end projecting through the head base assembly 23 and terminating enough above the base assembly so as to contact the actuator roller 92 when the head assembly 24 is in the position shown by FIGURE 7. On the other side of the base assembly 23, an actuator 162b similar to the one just described is positioned upon pin 161 of lever pair 159b and likewise projects through head base assembly 23. When the printing head 81 is moved through another printing cycle, the actuator roller 92 will be positioned above, and in contact with, actuator 162b. In the medial portion of the shaft 155 between the pairs of support levers 159a, 159b, there are two axially spaced slots around a portion of the periphery of the shaft as indicated in FIGURE 11 by numeral 163.

At these points the inner shaft 156 has an aperture in which is inserted a carrier pin 164 that projects through its respective slot 163 and terminates in the shoulder 165 of each of the two respective digit sensor carriers 166. The digit sensor carriers 166 projects downwardly toward the racks 122 and the clearing bar 128 and have located between the two individual carriers at the ends remote from the main shaft assembly 26 a sensor shaft 167 which carriers a plurality of rotatable sensors 168. The sensors 168 normally rest upon the upper surfaces of the racks 122 and, consequently, when the racks are moved longitudinally toward the front of the machine the camming surface 130 on each of the racks engages the respective sensor and causes the unitary pair of sensor carriers 166 to rotate upwardly thereby carrying inner shaft 156 with it in a rotary motion independent of the outer shaft 155.

At the extreme ends of the main shaft assembly 26, and positioned upon the ends of the inner shaft 156, are depending unlocking bars 171 having generally an L shaped hook portion 172 over which unlocking hooks 68, and specifically free hook portions 69, are adapted to rest. After a completion of a stroke and when the printing head 81 is at its limit position with all tabulator knobs 32 at their reference datum positions, the free hooks 69 rest over the L shaped hook portion 172 of the unlocking bars 171. This arrangement prevents longitudinal movement of the hook, line and shrinker assembly 70 until the inner shaft 156 is caused to rotate which, in effect, prevents movement of the printing head 81 as will be later described. The reference datum position is taken to mean the position when all the tabulator knobs 32 register "zero" at their uppermost position.

An especially important part of the operative mechanism of the present invention is the interconnecting toggle mechanism 173 shown in elevation by FIGURES 5, 9, and 10. The toggle mechanism generally interconnects the main shaft assembly 26 with the spring rate actuator 115 so that the motion of the main shaft 155 is transferred to the spring rate actuator. The toggle mechanism comprises an upper toggle link 174 and a lower toggle link 175. To provide an adjustment to vary the effective distance between the upper toggle link and the lower toggle link, an adjustment member 176 is pivoted to the upper toggle link by means of an upstanding member 177 integral with the adjustment 176. The member 177 is pivoted about pivot pin 178 of the upper toggle link to provide a unitary toggle mechanism. The pivot pin 178 is obviously not on the vertical line passing through the toggle centers of the upper and lower toggle links and, therefore, by adjusting the adjusting screws 179a and 179b it can be seen that the distance may be varied between the upper toggle link and the adjustment member. From the above description it is obvious that the upper toggle link 174 and the adjustment member 176 became in effect one unitary assembly which is rotatably interconnected with the lower toggle link 175 by means of a knuckle screw 181. The lower toggle link 175 projects upwardly past the interconnection point with knuckle screw 181 and has a stop portion 182. On opposite sides of the adjustment member 176 are a second pair of adjusting screws 183a and 183b which limit the throw of the toggle mechanism depending on the particular adjustment of the screws with respect to the stop portion 182. The lower portion of the lower toggle link 175 is pivotally mounted with respect to the spring rate actuator 115 by means of a support shaft 184 which passes through the spring rate actuator. To transfer movement from the main shaft assembly 26 to the toggle mechanism 173, the uppermost portion of upper link 174 is pivotally mounted about toggle actuator shaft 185 which extends from a toggle crank 186 affixed to the outer shaft 155 and terminates in the outermost actuator support lever 159a. The toggle mechanism is biased in its fully extended position by tension spring 187 positioned between spring lug 188 and knuckle joint lug 189. To "break" the knuckle joint of the toggle there is provided affixed to clearing bar 128 a right angle clip 191 so positioned that it will impinge against the knuckle joint at predetermined times upon movement of the clearing bar 128.

SUMMARY OF OPERATION

In operation of the present invention let it be assumed that an initial position is one that is shown in FIGURES 3, 7 and 8 wherein the imprinter head 81 is in its limit position on the right hand side of the machine and tabulator knobs 32 have been cleared to their reference datum position, which position, as seen through aperture 29, indicates a monetary reading of zero dollars and zero cents. This condition shows that the actuator roller 92 rests atop actuator 162a maintaining it in a depressed condition which revolves outer shaft 155 so that the toggle actuator shaft 185 and the unlocking interlocks 157 are in their intermediate condition, the most extreme downwardly pointing position having occurred at the end of the imprint but prior to clearing tabulator knobs 32 to their reference position. With the interlocks 157 positioned downwardly, the lifting pin 158 associated therewith is slightly spaced below the underside of shrinker 67 in FIGURE 8. This being the case, it is obvious that the unlocking hooks 68 and their associated free hook portion 69 engage the L shaped portion 172 of the unlocking bars 171. It follows then that the head release pins 71 are in engagement with the channel shaped arm 61 which, because of its bell crank action, is lying at its downwardmost position. The weight of the pin 71 and the arm 61 maintains the arm 61 in this downwardly facing position until such time as a linear force is applied to the hook, line and shrinker assembly 70.

In the assumed starting position the toggle actuator shaft 185, being in its downwardmost position, forces the entire toggle mechanism 173 downward which in turn causes the spring rate actuator 115 to have been rotated counterclockwise, as seen in FIGURE 9 about spring rate actuator shaft 136 and then rotated partially clockwise due to the knuckling action of knuckle screw 181 by having been upset by angle clip 191 when the clearing bar 129 has been pushed to its forwardmost position, as shown in FIGURE 5, thus forcing the toggle mechanism to assume its shorter length. Thus, the spring rate actuator is positioned in what might be called an intermediate spring rate position in which there is a light amount of tension upon the pawl springs 142. This causes the registration pawls 141 to be rotated about spring rate actuator shaft 136 in a manner that forces the registration pad 145 into intermediate engagement with the ratchet teeth 135 of the digit wheels 134. This gives a firm detent action to the digit wheels when they are revolving. When the rack teeth 125 mesh with the ratchet teeth 135 and the individual racks 122 are moved individually the digit wheels will revolve. The toggle mechanism 173 at the time the machine is cleared and ready for imprinting action is shown in FIGURE 5. At this time the length of the toggle mechanism is the shortest. That is, the distance between the spring rate actuator shaft 184 and the toggle actuator shaft 185 is less at this time than any other time during operation.

Until the pins 71 are caused to move vertically upward and disengage the head lock hook 97a from the ramp catch 99a, the head assembly 81 is unable to reciprocate across the head assembly 24 to provide imprinting upon the invoice card. To cause the pins 71 to move vertically upward, the machine operator must first move at least one tabulator knob 32 away from its reference datum position, which movement causes an extension arm 126 to move its associated rack 122 longitudinally. As a rack 122 moves, the cam surface 130 (FIGURE 11 is moved against the digit sensors 168 which in turn transmits a pivotal motion, as it is carried along the top surface of cam 130, to the digit sensor carrier 166. This pivotal motion is transmitted by carrier pin 164 to the inner-shaft 156 which in turn causes the unlocking bars 171 to rotate the L shaped hook portions 172 in such a manner as to move longitudinally the free hook portion 69 of unlocking hook 68. When looking at FIGURES 2 and 8 this motion would be in a clockwise manner. When the unlocking hook 68 moves, the entire hook, line and shrinker assembly 70 causes the unlocking lever 58 to act as a bell crank and lift the pins 71 vertically upward. As the pins 71 move upward they pass through the bores 72 and lift either head lock hook 97a or 97b, whichever the case may be. In the act being described with reference to FIGURE 7, head lock hook 97a is raised above ramp catch 99a thus releasing the imprinter head 81 for movement in a proper imprinting stroke. However, at this time the head 81 does not move of its own accord, but needs to be taken firmly in hand and reciprocated to the opposite limit position. It should be observed here that if all tabulator knobs 32 are again returned to zero, prior to executing an imprint, pin 71 will again drop and relock the machine, thereby defeating the possibility of recording all zeros under any circumstances.

As the head 81 is reciprocating the actuator roller 92 has removed from actuator 162a which is in turn caused to move vertically upward by the action of the main tension springs 147 forcing the spring rate actuator 115 to move the toggle mechanism 173 against the toggle actuator shaft 185, which in turn causes the outer shaft 155 to rotate in a manner forcing the support levers 159a and 159b to vertically force the actuators 162a, 162b upward. At this time the toggle mechanism assumes its longer length due to the action of the tension spring 187 pulling upon the lug 189 thereby forcing the toggle knuckle into an in-line position with respect to a line passing through shafts 184 and 185. The maximum spring rate is obtained by the maximum clockwise rotation of spring rate actuator 115 about shaft 136 by action of tension springs 147. The maximum spring rate is now acting upon pawl springs 142 which force the engagement of registration pad 145, and specifically the truncated apex 146, into firm engagement between the ratchet teeth 135. If for some reason a proper registration had not been made upon the digit wheels 134 when the tabulator knobs move the rack teeth into engagement with the ratchet teeth 135, then the maximum spring rate will force each registration pad to properly position the digit wheels 134.

If by reason of the truncated apex 146 of the registration pad 145 being in stable balance with a point of the ratchet teeth 135, which corresponds to an exact halfway position between the desired positions of the digit wheels, then the forward wall 137 of actuator 115 will force the improperly registered rack 122 to properly register by engaging the sloping surface of one of the teeth 149. Additionally, it is a function of wall 137 to prevent significant movement of the racks during printing.

As the imprinter head 81 releases either of the actuators 162a or 162b, the outer shaft rotates counterclockwise when viewed in FIGURE 2. Of course, this is first assuming that a selector knob 32 has first been moved from the reference datum position causing sensors carrier 166 to rotate clockwise which in turn moves inner shaft 156 clockwise. As shaft 156 moves it carries with it unlocking bars 171 and unlocking hooks 172 which longitudinally move the hook, line and shrinker assemblies to cause the unlocking levers 58 to move as a bell crank and lift up lifting arm 61. This action moves upwardly the pins 71 which raise head locking hooks from catches 99a or 99b as the case may be. At this time the head 81 may be reciprocated from the actuators.

Assuming the actuators have just raised as the head releases the one it has been holding downwardly, the outer shaft 155 revolves counterclockwise and causes unlocking interlocks 157 and lifting pins 158 to move upwardly thereby engaging the underside of hook, line and shrinker assemblies 70 in the region of shrinkers 67 and lifting the free hook ends 69 from engagement with unlocking hooks 172. After hook ends 69 become free from hooks 172, the weight of the shrinker assembly 70, which is now pointing generally in a downward slope toward the rear of the machine, causes the assembly 70 to slide upon pin 158. As this occurs the unlocking lever 58 falls downwardly about pivot 64 and pins 71 retract from bores 72 to allow locking when head 81 reaches the limit position and the respective hook 97a or 97b rides over ramp catch 99a or 99b.

As the actuators are depressed upon the head 81 reaching a limit position, the outer shaft is once again rotated in a clockwise direction causing the unlocking interlocks 157 and pins 158 to move downwardly from engagement with shrinker assembly 70. Since the L shaped hooks 172 are still in their clockwise position, the free hook ends 69 come to rest thereon but not in hooking engagement. This action, therefore, prevents the imprinter head 81 from being moved across the head assembly 24 in another printing stroke because the pins 71 cannot be raised until all of the tabulator knobs 32 have been returned to the reference datum position at the top of slots 31 in the selector plate 28. When the last selector knob is returned to the reference datum position the sensor carriers 166 pivot downwardly in a counterclockwise manner along the cam 130 and rest against the top surface of rack 122. As the sensor carriers 166 pivot downwardly the inner shaft 156 follows its motion carrying with it the L shaped hook portions 172 until the free hook portion 69 interlocks with the front faces of the hooks 172. At that time any subsequent movement of the tabulator knobs will cause the L shaped hook portions 172 to longitudinally move the shrinker assembly 70 and thus cause pins 71 to release the head assembly 81 for an additional imprinting stroke.

At the end of each imprinting stroke the tabulator knobs 32 should be returned to the reference datum position by movement of the clearing bar 128 which performs a dual function. One part of its function is to move all racks 122 to the cleared position concurrently. And the second function is to cause the right angle clip 191 to impinge against the knuckle joint of the toggle mechanism 173. From FIGURE 9 the toggle mechanism is shown at the end of a printing stroke but before being cleared and the distance between the shafts 184 and 185 is at its longer length. However, due to the fact that the spring rate actuator 115 is in its most counterclockwise position there is a minimum spring rate upon the pawl springs 142. This allows, by predetermined adjustment of the screws 143a, only a very light or no detent action between the registration pads 145 and the ratchet teeth 135. Therefore, as the clearing bar is moved bringing the right angle clip 191 against the knuckle joint of the toggle at a point in time when the last bit to be positioned is between the "one" and "zero reference datum," the toggle will break upon sufficient force being applied. This force overcomes the tension of toggle spring 187 and allows the toggle to assume its shorter length. This then puts an intermediate spring rate upon the pawl springs 142 and gives an intermediate detent action.

In operation of such an embodiment as shown by FIGURE 12, it would be unnecessary at the end of each imprinting stroke to return the tabulator knobs 32 to the reference datum position because this would be automatically done by the action of the tension springs 152. As noted before, once the imprinting stroke is completed the spring rate actuator 115 is in its most counterclockwise position thereby providing a minimum spring rate upon the pawl springs 142. This allows, by predetermined adjustment of the screws 143a, only a light, or no, detent between the registration pads 145 and ratchet teeth 135. At this time the springs 152 exert a force upon the racks 122 in excess of any detent force between pads 145 and teeth 135 and allow the racks to be returned to the reference datum position automatically. The clearing bar rack 128 will also be moved in a manner similar to that of racks 122 so that after the racks 122 are positioned in the reference datum position rack 128 will be caused to move by its associated spring 152 and bring the right angle clip 191 against the knuckle joint of the toggle mechanism 173.

Therefore, as the clearing bar is moved bringing the right angle clip 191 against the knuckle joint of the toggle at a point in time when the last bit to be positioned is between the "one" and "zero reference datum," the toggle will break. This force overcomes the tension of toggle spring 187 and allows the toggle to assume its shorter length and puts an intermediate spring rate upon the pawl springs 142 and gives an intermediate detent action. It should be observed here that the imprinting head assembly 81, of the embodiment shown by FIGURE 12, need not be locked in position at the termination of each stroke because even if the head assembly is reciprocated immediately after one imprint only "zeros" would be registered since all tabulator knobs 32 are returned to the reference datum position immediately upon the completion of any one imprinting stroke. However, for proper operation it is anticipated that all of the logic pertaining to locking the head assembly 81 after an imprint would be retained.

Once the invoice 46 is completed, a portion of it is normally given to the customer and the remaining portion which goes to the billing agency is then preferably placed in a locked compartment 192, as seen in FIGURE 7, having a hinged door 193 with a locking mechanism 194. Normally a space 195 is left between the door and chassis 27 so that the invoice may be inserted without opening the door.

While I have particularly shown and described one particular embodiment of the invention, it is distinctly understood that the invention is not limited thereto but that modifications may be made within the scope of the invention and such variations as are covered by the scope of the appended claims.

What is claimed is:

1. A printing apparatus comprising a chassis assembly, a head base assembly mounted on the chassis assembly, a head assembly supported by the head base assembly including a reciprocative printing head, the printing head having a platen adapted to move across a printing station, a plurality of type wheels coaxially mounted in adjacent relation, each of the type wheels having integral gear teeth and being capable of manual rotation to bring any one of a plurality of type characters into printing position at the printing station, selector means for rotating each type wheel individually, the selector means having a reference datum position, separate detent means for each wheel providing proper printing registration of each type character prior to imprinting the character, means for locking the printing head and platen against movement across the printing station until the selector means has been removed from the reference datum position.

2. A printing apparatus comprising a chassis assembly, a head base assembly mounted on the chassis assembly, a head assembly supported by the head base assembly including a reciprocative printing head, the printing head having a platen adapted to move across a printing station, a plurality of type wheels coaxially mounted in adjacent relation, each of the type wheels having integral gear teeth and being capable of manual rotation to bring any one of a plurality of type characters into printing position at the printing station, selector means for rotating each type wheel individually, the selector means comprising a plurality of tabulator knobs slidable along an indicia marked control panel, each tabulator knob being interconnected with an elongated rack member having gear means adapted for meshing engagement with one of the type wheels, the selector means having a reference datum position, separate detent means for each wheel providing proper printing registration of each type character prior to imprinting the character, means for locking the printing head and platen against movement across the printing station until the selector means has been removed from the reference datum position.

3. A printing apparatus comprising a chassis assembly, a head base assembly mounted on the chassis assembly, a head assembly supported by the head base assembly including a reciprocative printing head, the printing head having a platen adapted to move across a printing station, a plurality of type wheels coaxially mounted in adjacent relation, each of the type wheels having integral gear teeth and being capable of manual rotation to bring any one of a plurality of type characters into printing position at the printing station, selector means for rotating each type wheel individually, the selector means comprising a plurality of tabulator knobs slidable along an indicia marked control panel, each tabulator knob being interconnected with an elongated rack member having gear means adapted for meshing engagement with one of the type wheels, the rack members having locking means associated therewith to prevent the rack members from being displaced during movement of the printing head across the printing station, the selector means having a reference datum position, separate detent means for each wheel providing proper printing registration of each type character prior to imprinting the character, means for locking the printing head and platen against movement across the printing station until the selector means has been removed from the reference datum position.

4. A printing apparatus comprising a chassis assembly, a head base assembly mounted on the chassis assembly, a head assembly supported by the head base assembly including a reciprocative printing head, the printing head having a platen adapted to move across a printing station, a plurality of type wheels coaxially mounted in adjacent relation, each of the type wheels having integral gear teeth and being capable of manual rotation to bring any one of a plurality of type characters into printing position at the printing station, selector means for rotating each type wheel individually, the selector means having a reference datum position, separate detent means for each wheel providing proper printing registration of each type character comprising an array of pivotally mounted pawls each having a first end for engagement with one type wheel, a spring biased spring rate actuator mounted coaxially with the array of pawls and adapted to rotate relative thereto, resilient means interconnecting a second end of the pawls with the spring rate actuator, means for rotating the spring rate actuator to vary the effective distance between the spring rate actuator and the pawls thereby variably biasing the interconnecting resilient means to provide a detent force upon the type wheels of lesser extent after imprinting than before or during imprinting, means for locking the printing head platen against movement across the printing station until the selector means has been removed from the reference datum position.

5. A printing apparatus comprising a chassis assembly, a head base assembly mounted on the chassis assembly, a head assembly supported by the head base assembly including a reciprocative printing head, the printing head having a platen adapted to move across a printing station, a plurality of type wheels coaxially mounted in adjacent relation, each of the type wheels having integral gear teeth and being capable of manual rotation to bring any one of a plurality of type characters into printing position at the printing station, selector means for rotating each type wheel individually, the selector means having a reference datum position, separate detent means for each wheel providing proper printing registration of each type character prior to imprinting the character comprising an array of pivotally mounted pawls each having a first end for engagement with one type wheel, a spring biased spring rate actuator mounted coaxially with the array of pawls and adapted to rotate relative thereto, resilient means interconnecting a second end of the pawls with the spring rate actuator, means for rotating the spring rate actuator to vary the effective distance between the spring rate actuator and the pawls thereby variably biasing the interconnecting resilient means to provide a detent force upon the type wheels of lesser extent after imprinting than before or during imprinting, clearing means coacting with the selector means for returning the selector means to the reference datum position during the condition when the detent force upon the type wheels is the lesser, means responsive to the selector means for locking the printing head and platen against movement across the printing station until the selector means has been removed from the reference datum position.

6. A printing apparatus comprising a chassis assembly, a head base assembly mounted on the chassis assembly, a head assembly supported by the head base assembly including a reciprocative printing head, the printing head having a platen adapted to move across a printing station, a plurality of type wheels coaxially mounted in adjacent relation, each of the type wheels having integral gear teeth and being capable of manual rotation to bring any one of a plurality of type characters into printing position at the printing station, selector means for rotating each type wheel individually, the selector means comprising a plurality of tabulator knobs slidable along an indicia marked control panel, each tabulator knob being interconnected with an elongated rack member having gear means adapted for meshing engagement with one of the type wheels, the rack members having locking means associated therewith to prevent the rack members from being displaced during movement of the printing head across the printing station, the selector means having a reference datum position, separate detent means for each wheel providing proper printing registration of each type character prior to imprinting the character comprising an array of pivotally mounted pawls each having a first end for engagement with one type wheel, a spring biased spring rate actuator mounted coaxially with the array of pawls and adapted to rotate relative thereto, resilient means interconnecting a second end of the pawls with the spring rate actuator, means for rotating the spring rate actuator to vary the effective distance between the spring rate actuator and the pawls thereby variably biasing the interconnecting resilient means to provide a detent force upon the type wheels of lesser extent after imprinting than before imprinting and of a greater extent during imprinting than before imprinting, clearing means coacting with the selector means for returning the selector means to the reference datum position during the condition when the detent force upon the type wheels is the lesser, means responsive to the selector means for locking the printing head and platen against movement across the printing station until the selector means has been removed from the reference datum position.

7. A printing apparatus according to Claim 1 wherein the head assembly comprises head guide means flanking the printing head, the guide means adapted to receive the printing head for reciprocative movement in longitudinally extending guide slots, the guide slots maintaining the printing head and the platen in engagement with the printing station only when imprinting takes place.

8. A printing apparatus according to claim 7 wherein the guide slots have cam surfaces which force the platen into printing engagement with the printing station after the start of the imprint cycle and lift the platen out of engagement with the printing station before the end of the imprint cycle.

9. A printing apparatus according to claim 1 wherein the printing head locking means comprise catch means flanking the printing station, depending gravity operated hooks mounted on opposed sides of the printing head adapted for locking engagement with the catch means, the locking engagement being terminated upon predetermined movements of the selector means.

10. A printing apparatus comprising a chassis assembly, a head base assembly mounted on the chassis assembly, a head assembly supported by the head base assembly including a reciprocative printing head, the printing head having a platen adapted to move across a printing station, a plurality of type wheels coaxially mounted in adjacent relation, each of the type wheels having integral gear teeth and being capable of manual rotation to bring any one of a plurality of type characters into printing position at the printing station, selector means for rotating each type wheel individually, the selector means having a reference datum position denoting a zero condition on the apparatus, locking means associated with the printing head to prevent the platen from imprinting during the zero condition of the machine, means sensing movement of the selector means from the reference datum position and disengaging the platen from the locking means so that one complete imprinting cycle may occur as the printing head is reciprocated to an inactive position where locking of the printing head reoccurs and is maintained until such time as the selector means are returned to the reference datum position and then subsequently repositioned from the datum position.

11. A printing apparatus comprising a chassis assembly, a head base assembly mounted on the chassis assembly, a head assembly supported by the head base assembly including a reciprocative printing head, the printing head having a platen adapted to move across a printing station, a plurality of type wheels coaxially mounted in adjacent relation, each of the type wheels having integral gear teeth and being capable of manual rotation to bring any one of a plurality of type characters into printing position at the printing station, selector means for rotating each type wheel individually, the selector means having a reference datum position denoting a zero condition on the apparatus, the selector means including a plurality of rack members individually disposed in mesh arrangement with the respective type wheel gear teeth, locking means associated with the printing head to prevent the platen from imprinting during the zero condition of the machine, means sensing movement of the selector means from the reference datum position and disengaging the platen from the locking means so that one complete imprinting cycle may occur as the printing head is reciprocated to an inactive position where locking of the printing head reoccurs and is maintained until such time as the selector means are returned to the reference datum position and then subsequently repositioned from the datum position.

12. A printing apparatus comprising a chassis assembly, a head base assembly mounted on the chassis assembly, a head assembly supported by the head base assembly including a reciprocative printing head, the printing head having a platen adapted to move across a printing station, a plurality of type wheels coaxially mounted in adjacent relation, each of the type wheels having integral gear teeth and being capable of manual rotation to bring any one of a plurality of type characters into printing position at the printing station, selector means for rotating each type wheel individually, the selector means having a reference datum position denoting a zero condition on the apparatus, the selector means including a plurality of rack members individually disposed in meshing arrangement with the respective type wheel gear teeth, a plurality of recesses located on the rack members, rack means pivotally mounted and adapted for loose engagement with the recesses when the platen is imprinting on the printing station so that the type wheels are prevented from improper registration and significant movement during printing, locking means associated with the printing head to prevent the platen from imprinting during the zero condition of the machine, means sensing movement of the selector means from the reference datum position and disengaging the platen from the locking means so that one complete imprinting cycle may occur as the printing head is reciprocated to an inactive position where locking of the printing head reoccurs and is maintained until such time as the selector means are returned to the reference datum position and then subsequently repositioned from the datum position.

13. A printing apparatus comprising a chassis assembly, a head base assembly mounted on the chassis asembly, a head assembly supported by the head base assembly including a reciprocative printing head, the printing head having a platen adapted to move across a printing station, a plurality of type wheels coaxially mounted in adjacent relation, each of the type wheels having integral gear teeth and being capable of manual rotation to bring any one of a plurality of type characters into printing position at the printing station, selector means for rotating each type wheel individually, the selector means having a reference datum position denoting a zero condition on the apparatus, detent means for providing precision registration of each type wheel prior to imprinting comprising an array of pivotally mounted pawls each having a first end for engagement with one type wheel, a spring biased spring rate actuator mounted coaxially with the array of pawls and adapted to rotate relative thereto, resilient means interconnecting a second end of the pawls with the spring rate actuator, means for rotating the spring rate actuator to vary the effective distance between the spring rate actuator and the pawl thereby variably biasing the interconnecting resilient means to provide a detent force upon the type wheels of lesser extent after imprinting than before imprinting and greater extent during imprinting than before imprinting, locking means associated with the printing head to prevent the platen from imprinting during the zero condition of the machine, means sensing movement of the selector means from the reference datum position and disengaging the platen from locking means so that one complete imprinting cycle may occur as the printing head is reciprocated to an inactive position where locking of the printing head reoccurs and is maintained until such time as the selector means are returned to the reference datum position and then subsequently repositioned from the datum position.

14. A printing apparatus comprising a chassis assembly, a head base assembly mounted on the chassis assembly, a head assembly supported by the head base assembly including a reciprocative printing head, the printing head having a platen adapted to move across a printing station, a plurality of type wheels coaxially mounted in adjacent relation, each of the type wheels having integral gear teeth and being capable of manual rotation to bring any one of a plurality of type characters into printing position at the printing station, selector means for rotating each type wheel individually, the selector means having a reference datum position denoting a zero condition on the apparatus, the selector means including a plurality of rack members individually disposed in meshing arrangement with the respective type wheel gear teeth, a plurality of locking recesses located on the rack members, rack means pivotally mounted and adapted for loose engagement with the recesses when the platen is imprinting on the printing station so that the type wheels are prevented from improper registration and significant movement during printing, detent means for providing precision registration of each type wheel prior to imprinting comprising an array of pivotally mounted pawls each having a first end for engagement with one type wheel, a spring biased spring rate actuator mounted coaxially with the array of pawls and adapted to rotate relative thereto, resilient means interconnecting a second end of the pawls with the spring rate actuator, means for rotating the spring rate actuator to vary the effective distance between the spring rate actuator and the pawls thereby variably biasing the interconnecting resilient means to provide a detent force upon the type wheels of lesser extent after imprinting than before imprinting and greater extent during imprinting than after imprinting, locking means associated with the printing head to prevent the platen from imprinting during the zero condition of the machine, means sensing movement of the selector means from the reference datum position and disengaging the platen from the locking means so that one complete imprinting cycle may occur as the printing head is reciprocated to an inactive position where locking of the printing head reoccurs and is maintained until such time as the selector means are returned to the reference datum position and then subsequently repositioned from the datum position.

15. A printing apparatus comprising a chassis assembly, a head base assembly mounted on the chassis assembly, a head assembly supported by the head base assembly including a reciprocative printing head, the printing head having a platen adapted to move across a printing station, a plurality of type wheels coaxially mounted in adjacent relation, each of the type wheels having integral gear teeth and being capable of manual rotation to bring any one of a plurality of type characters into printing position at the printing station, selector means for rotating each type wheel individually, separate detent means for each wheel providing printing registration of each type character comprising an array of pivotally mounted pawls each having a first end for engagement with one type wheel, said array of pawls being adapted to engage their associated separate detent means, means for applying variable forces to the array of pawls for varying the force applied to the detent means.

16. A printing apparatus according to claim 15 wherein the means for applying the variable forces to the array of pawls comprises means to provide a detent force upon the type wheels of lesser extent after imprinting than before imprinting for setting the selector means to a reference datum position.

17. A printing apparatus according to claim 16, including means for providing a detent force upon the type wheels of relative maximum detent during imprinting.

18. A method of concurrently imprinting variable and fixed data on a document comprising, placing said fixed data adjacent said variable data, locating a document which is to be imprinted so that it overlies the fixed and variable data, preventing a platen from movable engagement over said document until the variable data have been set from a prior imprinting position to a reference datum position and thence repositioned to represent the present data to be imprinted, locking said variable data during the imprint operation, and releasing said variable data from their locked position to enable movement to the reference datum position for a subsequent imprint cycle.

19. A printing apparatus comprising a chassis assembly, a head base assembly mounted on the chassis assembly, a head assembly supported by the head base assembly including a reciprocative printing head, the printing head having a platen adapted to move across a printing station, a plurality of type wheels coaxially mounted in adjacent relation, each of the type wheels having integral gear teeth and being capable of manual rotation to bring any one of a plurality of type characters into printing position at the printing station, selector means for rotating each type wheel individually, the selector means having a reference datum position, separate detent means for each wheel providing proper printing registration of each type character prior to imprinting the character, means for automatically returning the selector means to the reference datum position after imprinting.

20. A printing apparatus comprising a chassis assembly, a head base assembly mounted on the chassis assembly, a head assembly supported by the head base assembly including a reciprocative printing head, the printing head having a platen adapted to move across a printing station, a plurality of type wheels coaxially mounted in adjacent relation, each of the type wheels having integral gear teeth and being capable of manual rotation to bring any one of a plurality of type characters into printing position at the printing station, selector means for rotating each type wheel individually, the selector means having a reference datum position, separate detent means for each wheel providing printing registration of each type character comprising an array of pivotally mounted pawls each having a first end for engagement with one type wheel, said array of pawls being adapted to engage their associated separate detent means, means for applying variable forces to the array of pawls for varying the force applied to the detent means, means for automatically returning the selector means to the reference datum position after imprinting.

21. A printing apparatus according to claim 20 wherein the means for applying the variable forces to the array of pawls comprises means to provide a detent force upon the type wheels of lesser extent after imprinting than before imprinting to permit automatic setting of the selector means to the reference datum position.

22. A printing apparatus according to claim 21, including means for providing a detent force upon the type wheels of relative maximum detent during imprinting.

23. A method of concurrently imprinting variable and fixed data on a document comprising, placing said fixed data adjacent said variable data, locating a document which is to be imprinted so that it overlies the fixed and variable data, positioning the variable data from a reference datum position to represent the present data to be imprinted, locking said variable data during the imprint operation, releasing said variable data from their locked position to enable automatic movement of the variable data to the reference datum position for a subsequent imprint cycle.

References Cited by the Examiner

UNITED STATES PATENTS

| | | | |
|---|---|---|---|
| 3,083,641 | 4/1963 | Childs et al. | 101—269 |
| 3,138,091 | 6/1964 | Maul | 101—45 |
| 3,170,396 | 2/1965 | Avgerinos | 101—269 |

ROBERT E. PULFREY, *Primary Examiner.*

W. McCARTHY, *Assistant Examiner.*